(12) United States Patent
Murphy et al.

(10) Patent No.: US 10,082,179 B2
(45) Date of Patent: Sep. 25, 2018

(54) SEAL FOR SELF ALIGNING ROLLER BEARING

(71) Applicant: ROLLER BEARING COMPANY OF AMERICA, INC., Oxford, CT (US)

(72) Inventors: Richard Murphy, Torrington, CT (US); Dean P. Johnston, Litchfield, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/967,632

(22) Filed: Dec. 14, 2015

(65) Prior Publication Data

US 2016/0186813 A1    Jun. 30, 2016

Related U.S. Application Data

(60) Provisional application No. 62/092,598, filed on Dec. 16, 2014.

(51) Int. Cl.
*F16C 33/78*        (2006.01)
*F16J 15/322*      (2016.01)
(Continued)

(52) U.S. Cl.
CPC ............ *F16C 33/783* (2013.01); *F16C 19/26* (2013.01); *F16C 23/08* (2013.01); *F16C 23/086* (2013.01);
(Continued)

(58) Field of Classification Search
CPC .... F16C 23/08; F16C 23/086; F16C 33/7806; F16C 33/7826; F16C 33/783;
(Continued)

(56) References Cited

U.S. PATENT DOCUMENTS

| | | |
|---|---|---|
| 1,376,311 A | 4/1921 | Armstrong |
| 1,795,471 A | 3/1931 | Buckwalter |

(Continued)

FOREIGN PATENT DOCUMENTS

| | | |
|---|---|---|
| CA | 448771 A | 5/1948 |
| CA | 2780513 A | 5/2011 |

(Continued)

OTHER PUBLICATIONS

Extended European Search Report issued in corresponding European Application No. 15200417.2 dated May 12, 2016, pp. 1-9.

(Continued)

*Primary Examiner* — James Pilkington
(74) *Attorney, Agent, or Firm* — Murtha Cullina LLP

(57) ABSTRACT

A seal for a bearing includes an annular retaining ring defining a first radially innermost portion and a first radially outer end; and a resilient ring defining a second radially innermost portion and a second radially outer end. The first radially innermost portion and the second radially innermost portion are aligned with one another and together define a securing root of the seal. The root is adapted to seat in a groove of an inner ring of the bearing. The resilient ring projects radially outward from the annular retaining ring. The resilient ring is more flexible than the annular retaining ring. The second radially outer end defines a sealing surface adapted to slidingly engage an inner bearing surface of an outer ring of the bearing. The first radially outer end of the retaining ring terminates between the first radially innermost portion and the second radially outer end of the resilient ring.

17 Claims, 4 Drawing Sheets

(51) Int. Cl.
*F16C 23/08* (2006.01)
*F16C 19/26* (2006.01)
*F16J 15/3268* (2016.01)

(52) U.S. Cl.
CPC ...... *F16C 33/7806* (2013.01); *F16C 33/7816* (2013.01); *F16C 33/7856* (2013.01); *F16C 33/7889* (2013.01); *F16J 15/322* (2013.01); *F16J 15/3268* (2013.01); *F16C 2226/74* (2013.01)

(58) Field of Classification Search
CPC .............. F16C 33/7856; F16C 33/7889; F16C 2226/74; F16J 15/322; F16J 15/3268
See application file for complete search history.

(56) References Cited

U.S. PATENT DOCUMENTS

| | | | |
|---|---|---|---|
| 1,902,662 A | 3/1933 | Phelps | |
| 2,254,304 A | 9/1941 | Miller | |
| 2,310,607 A | 2/1943 | Batesole | |
| 2,353,988 A | 7/1944 | Batesole et al. | |
| 2,387,962 A | 10/1945 | Williams | |
| 2,728,616 A | 12/1955 | Potter | |
| 2,764,432 A | 9/1956 | Leister et al. | |
| 2,767,037 A | 10/1956 | Williams | |
| 2,856,246 A | 10/1958 | Gaubatz | |
| 3,085,810 A * | 4/1963 | Howe, Jr. | F16C 33/7856 277/560 |
| 3,090,628 A | 5/1963 | Giulietti | |
| 3,114,559 A | 12/1963 | Miglietti et al. | |
| 3,396,977 A | 8/1968 | Iguchi | |
| 3,748,003 A | 7/1973 | Barber | |
| 3,792,912 A | 2/1974 | Howe, Jr. et al. | |
| 3,869,181 A | 3/1975 | Barber | |
| 4,043,619 A | 8/1977 | Teske et al. | |
| 4,333,694 A | 6/1982 | Howe, Jr. | |
| 4,725,026 A | 2/1988 | Krafka et al. | |
| 5,017,024 A | 5/1991 | Clark et al. | |
| 5,044,782 A | 9/1991 | Jankowski | |
| 5,413,416 A | 5/1995 | Grunze et al. | |
| 5,441,351 A | 8/1995 | Grunze | |
| 5,582,483 A | 12/1996 | Grunze et al. | |
| 6,003,876 A | 12/1999 | Yamagishi et al. | |
| 6,394,656 B1 | 5/2002 | Williams | |
| 8,006,940 B2 | 8/2011 | Zeumer | |
| 8,061,903 B2 | 11/2011 | Kolar | |
| 8,070,106 B2 | 12/2011 | Englebrecht et al. | |
| 8,220,743 B2 | 7/2012 | McAlinden et al. | |
| 8,302,913 B2 | 11/2012 | Schlipf | |
| 8,302,914 B2 | 11/2012 | Zeumer | |
| 8,398,019 B2 | 3/2013 | Schlipf | |
| 8,511,611 B2 | 8/2013 | Blades | |
| 8,534,612 B2 | 9/2013 | Morris | |
| 8,567,727 B2 | 10/2013 | Morris | |
| 8,651,428 B2 | 2/2014 | Parker | |
| 8,702,312 B2 | 4/2014 | Yamada et al. | |
| 8,714,493 B2 | 5/2014 | Morris | |
| 8,740,464 B2 | 6/2014 | Berns | |
| 8,956,052 B2 | 2/2015 | Hofbauer et al. | |
| 2003/0001444 A1 | 1/2003 | Coles et al. | |
| 2005/0058382 A1 | 3/2005 | Williams | |
| 2008/0040886 A1 | 2/2008 | Arnold et al. | |
| 2010/0032520 A1 | 3/2010 | Colosi | |
| 2010/0059633 A1 | 3/2010 | Pohl | |
| 2011/0127385 A1 | 6/2011 | Morris | |
| 2011/0136578 A1 | 6/2011 | Kawamura | |
| 2011/0274382 A1 | 11/2011 | Berns et al. | |
| 2012/0155792 A1 | 6/2012 | Docimo | |
| 2012/0163745 A1 | 6/2012 | Maeda | |
| 2013/0087662 A1 | 4/2013 | Soenario | |
| 2014/0248016 A1 | 9/2014 | Habibvand | |
| 2015/0110431 A1 | 4/2015 | Engstrom et al. | |
| 2015/0176652 A1 | 6/2015 | Back et al. | |
| 2015/0292561 A1 | 10/2015 | McNeil et al. | |

FOREIGN PATENT DOCUMENTS

| | | |
|---|---|---|
| CN | 201106636 Y | 8/2008 |
| CN | 201428739 Y | 3/2010 |
| CN | 201916352 U | 8/2011 |
| CN | 201925341 U | 8/2011 |
| CN | 204200857 U | 3/2015 |
| DE | 3906656 A1 | 9/1989 |
| DE | 102009012076 T2 | 5/1996 |
| DE | 102013114437 A1 | 9/2010 |
| DE | 69205157 A1 | 7/2017 |
| EP | 0189365 A1 | 7/1986 |
| EP | 1092883 A2 | 4/2001 |
| EP | 2046650 B1 | 5/2010 |
| EP | 2035275 B1 | 9/2010 |
| EP | 2266817 A2 | 12/2010 |
| EP | 2567109 A1 | 3/2013 |
| EP | 2578894 A1 | 4/2013 |
| EP | 2589829 A1 | 4/2013 |
| FR | 2159927 A5 | 6/1973 |
| JP | H10-141380 A | 5/1998 |
| KR | 101546557 B1 | 8/2015 |
| WO | 200200221007 A1 | 3/2002 |
| WO | 2010094361 A1 | 8/2010 |
| WO | 2010130669 A1 | 11/2010 |
| WO | 2011093922 A1 | 8/2011 |
| WO | 2011140230 A1 | 11/2011 |
| WO | 2014021958 A1 | 2/2014 |

OTHER PUBLICATIONS

International Search Report for PCT/US2014/019522, dated Jun. 6, 2014.
International Preliminary Report on Patentability for PCT/US2014/019522, dated Jan. 26, 2015.
Extended European Search Report for European Application No. 14171081.4-1754 / 2927115, dated Dec. 14, 2015.

* cited by examiner

SEAL FOR SELF ALIGNING ROLLER BEARING

CROSS REFERENCE TO RELATED APPLICATIONS

This patent application claims the benefit of U.S. Provisional Patent Application Ser. No. 62/092,598, filed on Dec. 16, 2014, which is hereby incorporated by reference in its entirety.

FIELD OF THE INVENTION

The present invention relates generally to a seal for a roller bearing, and more specifically to a seal for a roller bearing that includes an annular retaining ring and a resilient ring, the annular retaining ring and the resilient ring misaligning with an inner race of the bearing and thus facilitating self-alignment of the seal in the bearing.

BACKGROUND OF THE INVENTION

Seals are typically employed in bearings as a means of abating contamination of dynamic surfaces. Prior art seals, as shown in FIG. 4, have a cap and seal 10' fixed in grooves 24' in an outer ring 16'. The seal 10' rotates and misaligns on a spherical surface 26' of an inner ring 18'. The cap and seal 10' and the outer ring 16' misalign with one another, allowing misalignment in each the direction annotated by the arrow B' and the direction annotated by the arrow C'. If misalignment occurs at an angle greater than angle B, the seal 10" may contact the roller 22'. If misalignment occurs at an angle greater than angle C, the seal 10''' may exceed the boundaries of the spherical surface 26' and lose contact with the inner ring 18'. Either such manner of misalignment impedes optimal functioning of the bearing 100'. A seal that minimizes risk of misalignment via self-aligning features has long been sought in the art.

SUMMARY OF THE INVENTION

There is disclosed herein a seal for a bearing. The seal includes an annular retaining ring defining a first radially innermost portion and a first radially outer end; and a resilient ring defining a second radially innermost portion and a second radially outer end. The first radially innermost portion and the second radially innermost portion are aligned with one another and together define a securing root of the seal. The root is adapted to seat in a groove of an inner ring of the bearing. The resilient ring projects radially outward from the annular retaining ring. The resilient ring is more flexible than the annular retaining ring. The second radially outer end defines a sealing surface adapted to slidingly engage an inner bearing surface of an outer ring of the bearing. The first radially outer end of the retaining ring terminates between the first radially innermost portion and the second radially outer end of the resilient ring.

Further disclosed herein is a bearing. The bearing includes an outer ring having a first inner surface defining an interior area; and an inner ring having an outer surface. A portion of the inner ring is disposed in the interior area. The annular seal assembly snap-fit into the inner ring, for example, one seal assembly is snap fit into each of two opposing axial sides of the inner ring. Each of the annular seal assemblies include an annular retaining ring defining a first radially innermost portion and a first radially outer end; and a resilient ring defining a second radially innermost portion and a second radially outer end. The first radially innermost portion and the second radially innermost portion are aligned with one another. The resilient ring projects radially outward from the annular retaining ring and the resilient ring is positioned axially inward from the annular retaining ring. The resilient ring is more flexible (e.g., elastomeric versus metallic) than the annular retaining ring. A radially outward facing groove is formed on the inner ring proximate an axial end of the inner ring. The groove is defined by opposing side walls and a base extending between the opposing side walls. A portion of the annular retaining ring proximate the first radially innermost portion and a portion of the resilient ring proximate the second radially innermost portion is seated between the opposing side walls. The second radially outer end of the resilient ring slidingly engages a portion of the inner surface of the outer ring. The first radially outer end of the retaining ring terminates between the first radially innermost portion and the second radially outer end of the resilient ring.

DETAILED DESCRIPTION

Figure 1:
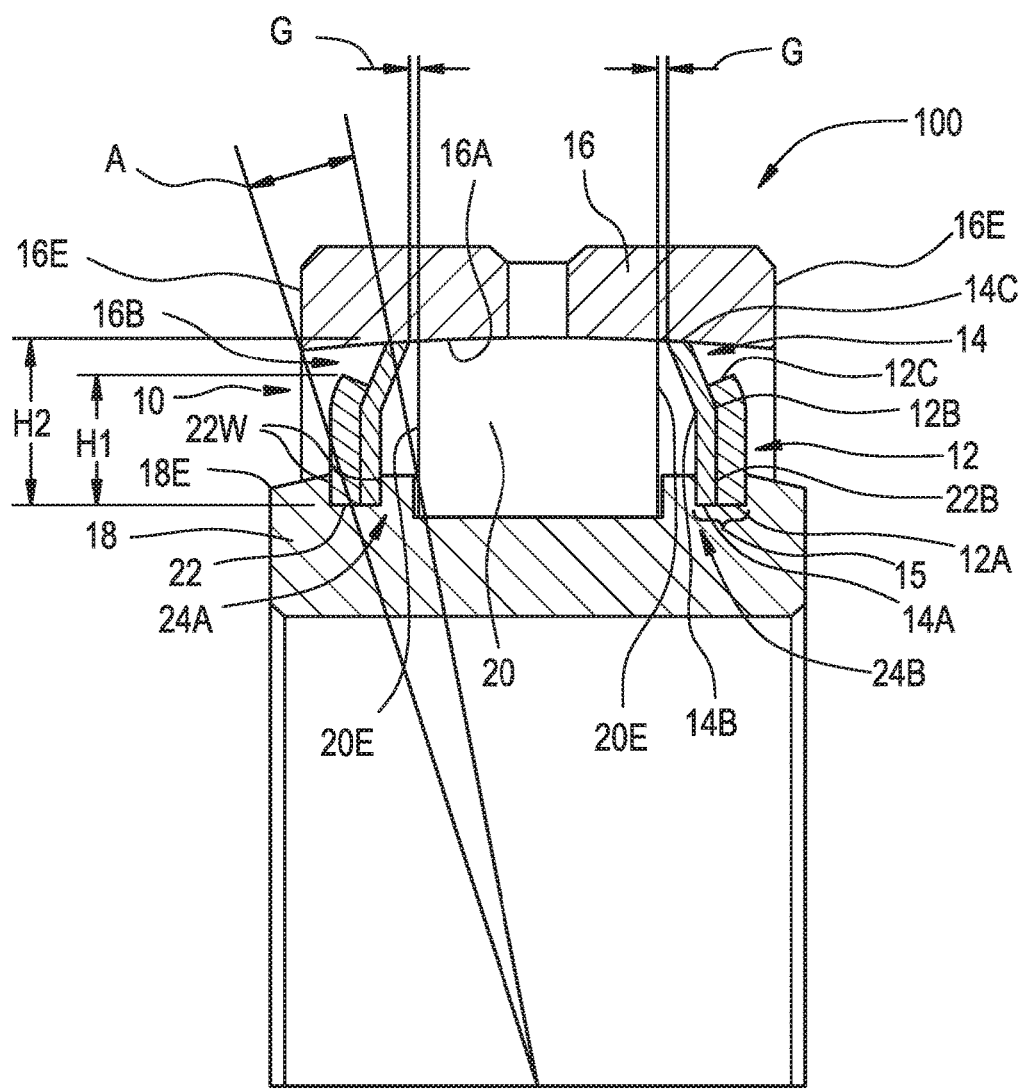
FIG. 1 is a cross sectional view of a seal of the present invention positioned in a suitable bearing.
Figure 2:
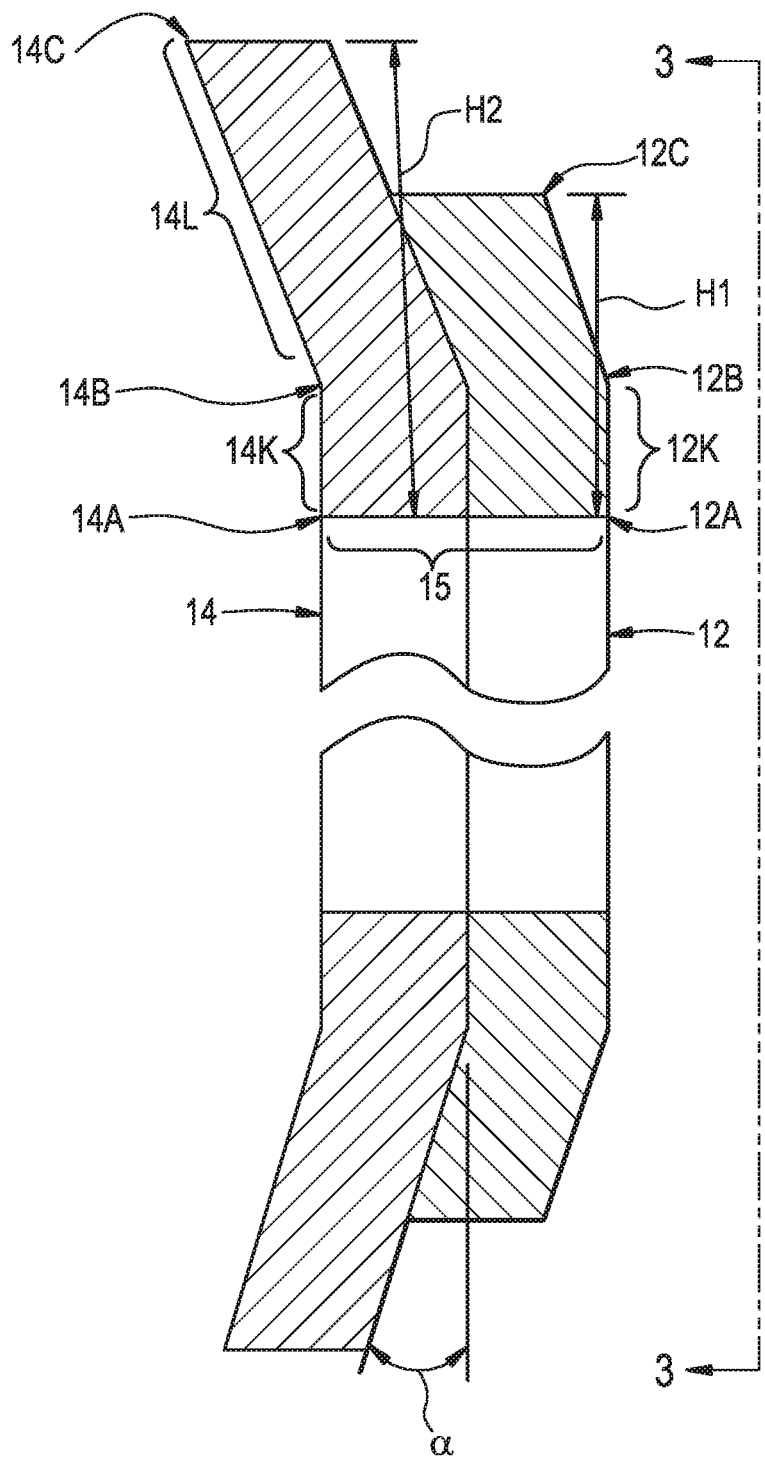
FIG. 2 is a cross sectional view of the seal of the present invention.
Figure 3:
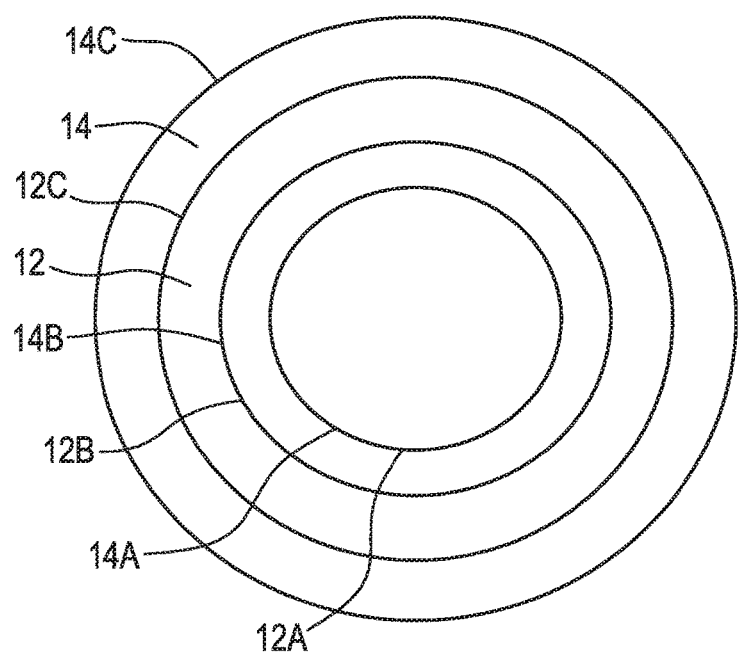
FIG. 3 is a side view of the seal of the present invention.

As shown in FIGS. 1, 2 and 3, a seal 10 for a bearing 100 includes an annular retaining ring 12 and a resilient ring 14. A first radially innermost portion 12A (i.e., a first radially innermost circumferential edge) is defined by the annular retaining ring 12. A second radially innermost portion 14A (i.e. a second radially innermost circumferential edge) is defined by the resilient ring 14. The first radially innermost portion 12A of the annular retaining ring 12 is aligned with the second radially innermost portion 14A of the resilient ring 14 such that the first radially innermost portion 12A and the second radially innermost portion 14A are equidistant from a central axis C, common to the annular retaining ring 12 and the resilient ring 12, as shown in FIGS. 2 and 3. The resilient ring 14 projects radially outward from the annular retaining ring 12. The resilient ring 14 is more flexible than the annular retaining ring 12. The resilient ring 14 needs to be more flexible than the annular retaining ring 12 in order force the radially outermost portion 14C of the resilient ring 14 toward the roller(s) 20 maintaining the bend 12B in the resilient ring 14 and ensuring the resilient ring 14 will remain in the correct sealing position.

In one embodiment, as shown in FIGS. 2 and 3, the annular retaining ring 12 and the resilient ring 14 engage one another. For example, the annular retaining ring 12 and the resilient ring 14 engage one another across the first bend 12B and the second bend 14B, as shown in FIG. 2. Further, in this embodiment, the retaining ring 12 includes a first bend 12B in the retaining ring 12. The first bend 12B is located between the first radially innermost portion 12A and a first radially outermost portion 12C (i.e., a first radially outermost circumferential edge). The first bend 12B cooperates with the resilient ring 14 to define a second bend 14B in the resilient ring 14. The second bend 14B is located between the second radially innermost portion 14A and a second radially outermost portion 14C (i.e., a second radially outermost circumferential edge). In one embodiment, the first bend 12B is defined by an angle α greater than zero, for example, an angle of between zero and 20 degrees, as shown in FIG. 2. In one embodiment, the second bend 14B is defined by at an angle α greater than zero, for example, an angle of between zero and 20 degrees, as shown in FIG. 2. The annular retaining ring 12 has a first straight section 12K that extends radially outward from the first radially inner most circumferential edge 12A and transitions into the single first bend 12B defined by the angle α relative to the first straight section 12K. The first bend 12B terminates at the first radially outermost circumferential edge 12C. The a angle is greater than zero. The resilient ring 14 has a second straight section 14K that extends radially outward from the second radially inner most circumferential edge 14A and transitions into the single second bend 14B. The second bend 14B is defined by the angle α which is measured relative to the second straight section 14K. A third straight section 14L that extends from the second bend 14B at angle α. The third straight section 14L terminates at the second radially outermost circumferential edge 14C. The annular retaining ring 12 and the resilient ring 14 engage one another so that the first bend 12B extends over the second bend 14B.

In one embodiment, the resilient ring 14 includes polytetrafluoroethylene. In one embodiment, the resilient ring 14 includes a thermoplastic elastomer. In one embodiment, resilient ring includes nitrile rubber. In one embodiment, the resilient ring 14 includes a combination of polytetrafluoroethylene and a thermoplastic elastomer. In one embodiment, the resilient ring 14 includes a combination of polytetrafluoroethylene and nitrile rubber. In one embodiment, the resilient ring 14 includes a combination of a thermoplastic elastomer and nitrile rubber. In one embodiment, the resilient ring 14 includes a combination of polytetrafluoroethylene, a thermoplastic elastomer and nitrile rubber. Although compositions including polytetrafluoroethylene, a thermoplastic elastomer and nitrile rubber are described herein, the present invention is not limited in this regard, as any suitable composition that could be reasonably said to have similar properties may be employed to the same effect.

In one embodiment, the retaining ring 12 includes metal. In one embodiment, the retaining ring 12 includes a metal that is a 300 series stainless steel. In one embodiment, the retaining ring 12 includes a metal that is a 1008 steel. In one embodiment, the retaining ring 12 includes a metal that is a 1010 steel.

In one embodiment, as shown in FIG. 1, a bearing 100 includes an outer ring 16 and an inner ring 18. The outer ring 16 has a first inner surface 16A (e.g., a spherical surface) that defines an interior area 16B. The inner ring 18 has an outer surface 18A. A portion of the inner ring 18 is disposed in the interior area 16B. An annular seal assembly 10 is snap-fit into the inner ring 18. In particular, the first radially innermost circumferential edge 12A and the second radially innermost circumferential edge 14A define a securing root 15 of the annular seal assembly 10 such that the securing root 15 is snap fittingly secured and seated in a groove 22 between the opposing side walls 22W, as described herein. In one embodiment, two or more annular seal assemblies 10 are snap fit into the inner ring 18. Each of the annular seal assemblies 10 includes an annular retaining ring 12 and a resilient ring 14. The annular retaining ring 12 defines a first radially innermost portion 12A. The resilient ring 14 defines a second radially innermost portion 14A. The first radially innermost portion 12A is aligned with the second radially innermost portion 14A. The resilient ring 14 is more flexible than the annular retaining ring 12.

In one embodiment, as shown in FIG. 1, the bearing 100 defines a radially outward facing groove 22 that is formed proximate an axial end 18E of the inner ring 18. The groove 22 is defined by opposing radially extending side walls 22W and a base 22B. The base 22B extends between the opposing side walls 22W. The base 22B is concentric with the central axis C is in complementary in shape to the aligned first radially innermost portion 12A and the second radially innermost portion 14A. A portion of the annular retaining ring 12 proximate the first radially innermost portion 12A and a portion of the resilient ring 14 proximate the second radially innermost portion 14A is seated between the opposing side walls 22W.

In one embodiment, as shown in FIG. 1, the bearing 100 includes a plurality of rollers 20 that are disposed between the inner ring 18 and the outer ring 16. The plurality of rollers 20 are positioned between a first shoulder 24A of the inner ring 18 and a second shoulder 24B of the inner ring 16. In one embodiment, 14 each of the rollers defines a roller axial end 20E. The second radially outermost portion 14C of the resilient ring 14 is spaced apart from the roller axial end by a gap G. In one embodiment, the gap G is 0.0127 cm (=0.005 inches). In one embodiment, the gap G is 0.0254 cm (=0.01 inches). In one embodiment, the inner ring 18 is misaligned with the outer ring 16 the gap G remains constant and the second radially outermost portion 14C of the resilient ring 14 remains axially inward of opposing axial ends 16E of the outer ring. Although a roller bearing is depicted in FIG. 1, the present invention is not limited in this regard, as any suitable bearing may be fitted with the seal of the present invention to the same effect, including but not limited to hourglass bearings and spherical bearings.

In one embodiment, a radially outer end 14C of the resilient ring 14 slidingly engages a portion of the inner surface 16A of the outer ring 16. As shown in FIG. 2, in one embodiment, the annular retaining ring 12 and the resilient ring 14 engage one another. Further, in this embodiment, the retaining ring 12 includes a first bend 12B that is located between the first radially innermost portion 12A and a first radially outermost portion 12C. The first bend 12B cooperates with the resilient ring 14 to define a second bend 14B in the resilient ring 14 that is located between the second radially innermost portion 14A and a second radially outermost portion 14C.

In one embodiment, as best shown in FIG. 2, the first bend 12B and the second bend 14B arrange the first radially outermost portion 12C and the second radially outermost portion 14C axially inward from the first bend 12B and the second bend 14B. In one embodiment, each of the first bend 12B and the second bend 14B is defined by an angle α of zero to 30 degrees. In one embodiment, each of the first bend 12B and the second bend 14B is defined by an angle α of zero to 20 degrees.

Figure 4:
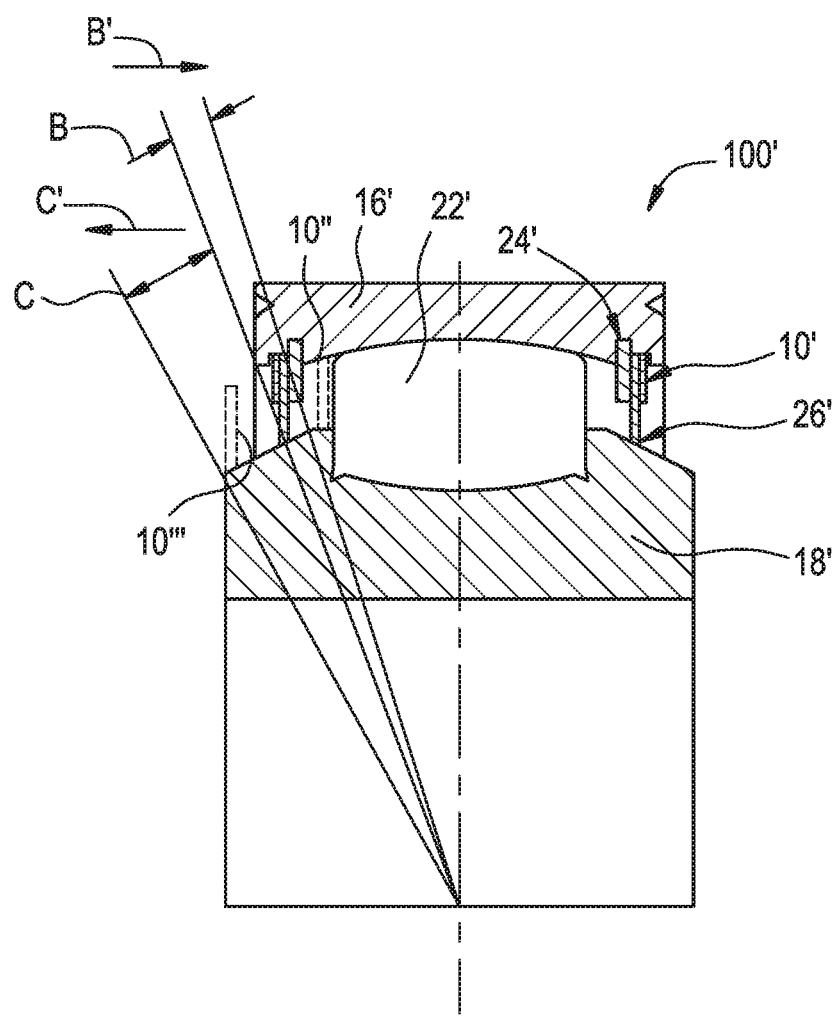
FIG. 4 is a cross sectional view of a prior art seal positioned in a suitable prior art bearing.

The resilient ring 14 and the annular retaining ring 12 misalign and rotate in conjunction with the inner ring 18. Annular retaining ring 12, resilient ring 14, and inner ring 18 are in fixed relationship to each other. As a result of the synchronous misalignment of the resilient ring 14, the annular retaining ring 12 and the inner ring 18, the dimensions of the gap G remain constant throughout misalignment. The plurality of rollers 20 (via their position between the first shoulder 24A and the second shoulder 24B), the annular retaining ring 12 and the resilient ring 14 misalign with the inner ring 18. Consequently, misalignment is possible within the entire bounds of the inner diameter of the outer ring 16. In contrast to prior art FIG. 4, as shown in FIG. 1, misalignment needs only not to exceed an angle A. The configuration set forth herein facilitates self-alignment.

Referring to FIGS. 1 and 2, the annular retaining ring 12 defines a first radial height H1 measured from the first radially innermost portion 12A to the first radially outermost portion 12C. A second radial height H2 is defined between the second radially innermost portion 14A and the radially outermost portion 14C of the resilient ring 14 (i.e., at a point on the first inner surface 16A of the outer ring 16). In one embodiment, the second radial height H2 is grater than the first radial height H1. In one embodiment, a ratio R of the first radial height H1 to the second radial height H2 is about 0.6 to 0.9. In one embodiment, a ratio R of the first radial height H1 to the second radial height H2 is about 0.7 to 0.8. In one embodiment, a ratio R of the first radial height H1 to the second radial height H2 is about 0.7 to 0.9. In one embodiment, a ratio R of the first radial height H1 to the second radial height H2 is about 0.6 to 0.8.

Although the present invention has been disclosed and described with reference to certain embodiments thereof, it should be noted that other variations and modifications may be made, and it is intended that the following claims cover the variations and modifications within the true scope of the invention.

What is claimed is:

1. A seal for a bearing, the seal comprising:
an annular retaining ring being concentric about a central axis and defining a first radially innermost circumferential edge and a first radially outermost circumferential edge;
a resilient ring being concentric about the central axis and defining a second radially innermost circumferential edge and a second radially outermost circumferential edge;
the first radially innermost circumferential edge and the second radially innermost circumferential edge being aligned with one another such that the first radially innermost circumferential edge and the second radially innermost circumferential edge are equidistant from the central axis and together define a securing root of the seal, the root being adapted to seat in a groove of an inner ring of the bearing such that the annular retaining ring, resilient ring, and inner ring are in fixed relationship to each other;
the resilient ring projecting radially outward beyond the annular retaining ring;
the resilient ring being more flexible than the annular retaining ring;
the second radially outermost circumferential edge defining a sealing surface adapted to slidingly engage an inner bearing surface of an outer ring of the bearing; and
the first radially outermost circumferential edge of the retaining ring terminates between the first radially innermost circumferential edge and the second radially outermost circumferential edge of the resilient ring.

2. The seal according to claim 1, wherein:
the retaining ring comprising a first straight section extending radially outward from the first radially inner most circumferential edge and transitioning into a single first bend defined by a first angle relative to the first straight section, the first bend terminates at the first radially outermost circumferential edge, and the first angle being greater than zero;
the resilient ring comprising a second straight section extending radially outward from the second radially inner most circumferential edge and transitioning into a single second bend defined by a second angle relative to the second straight section, a third straight section extending from the second bend at the second angle, the third straight section terminating at the second radially outermost circumferential edge, and the second angle being greater than zero and equal to the first angle; and
the annular retaining ring and the resilient ring engaging one another so that the first bend extends over the second bend.

3. The seal according to claim 2, wherein the annular retaining ring and the resilient ring engage one another across the entirety of the first bend and the second bend.

4. The seal according to claim 1, wherein the resilient ring comprises at least one of polytetrafluoroethylene, a thermoplastic elastomer and nitrile rubber.

5. The seal according to claim 1, wherein the annular retaining ring comprises metal.

6. The seal according to claim 5, wherein the metal is one of a 300 series stainless steel, a 1008 steel and a 1010 steel.

7. The seal according to claim 1, wherein the seal defines a ratio of a first radial height H1 of the annular retaining ring to a second radial height H2 of the resilient ring of about 0.6 to 0.9.

8. A bearing comprising:
an outer ring having a first inner surface defining an interior area;
an inner ring having an outer surface, a portion of the inner ring being disposed in the interior area;
at least one annular seal assembly snap-fit into the inner ring, each of the at least one annular seal assembly comprising:
an annular retaining ring being concentric about a central axis and defining a first radially innermost circumferential edge-and a first radially outermost circumferential edge;
a resilient ring being concentric about the central axis and defining a second radially innermost circumferential edge-and a second radially outermost circumferential edge;
the first radially innermost circumferential edge-and the second radially innermost circumferential edge-being aligned with one another such that the first radially innermost circumferential edge and the second radially innermost circumferential edge are equidistant from the central axis;
the resilient ring projecting radially outward beyond the annular retaining ring and the resilient ring being positioned axially inward from the annular retaining ring; and
the resilient ring being more flexible than the annular retaining ring; and
a radially outward facing groove formed on the inner ring proximate an axial end of the inner ring, the groove being defined by opposing side walls and a base extending between the opposing side walls; and
the first radially innermost circumferential edge and the second radially innermost circumferential edge defining a securing root of the annular seal assembly, the securing root being snap fittingly secured and seated in the groove between the opposing side walls such that the annular retaining ring, resilient ring, and inner ring are in fixed relationship to each other; and
wherein the second radially outermost circumferential edge of the resilient ring slidingly engages a portion of the inner surface of the outer ring; and wherein the first radially outermost circumferential edge of the retaining ring terminates between the first radially innermost circumferential edge-and the second radially outermost circumferential edge of the resilient ring.

9. The bearing according to claim 8, further comprising:
a plurality of rollers disposed between the inner ring and the outer ring.

10. The bearing according to claim 9, wherein each of the plurality of rollers defines a roller axial end and the second radially outermost circumferential edge of the resilient ring is spaced apart from the roller axial end by a gap.

11. The bearing according to claim 10, wherein the gap is 0.0127 cm (=0.005 inches).

12. The bearing according to claim 10, wherein when the inner ring is misaligned with the outer ring the gap remains constant and the second radially outermost circumferential edge-of the resilient ring remains axially inward of opposing axial ends of the outer ring.

13. The bearing according to claim 10, wherein the gap is 0.0254 cm (=0.01 inches).

14. The bearing according to claim 8, wherein:
the retaining ring comprising a first straight section extending radially outward from the first radially inner most circumferential edge and transitioning into a single first bend defined by a first angle relative to the first straight section, the first bend terminates at the first radially outermost circumferential edge, and the first angle being greater than zero;

the resilient ring comprising a second straight section extending radially outward from the second radially inner most circumferential edge and transitioning into a single second bend defined by a second angle relative to the second straight section, a third straight section extending from the second bend at the second angle, the third straight section terminating at the second radially outermost circumferential edge, and the second angle being greater than zero and equal to the first angle; and the annular retaining ring and the resilient ring engaging one another so that the first bend extends over the second bend.

15. The bearing according to claim 14, wherein the annular retaining ring and the resilient ring engage one another across the entirety of the first bend and the second bend.

16. The bearing according to claim 8, wherein the second radially outermost circumferential edge is positioned axially inward from the second radially innermost circumferential edge.

17. The bearing according to claim 8, wherein the base of the groove is concentric with the central axis and is complementary in shape to the first radially innermost circumferential edge; and
the first radially innermost circumferential edge and the second radially innermost circumferential edge are seated on the base.

* * * * *